US007788964B2

(12) United States Patent
Thillen et al.

(10) Patent No.: US 7,788,964 B2

(45) Date of Patent: Sep. 7, 2010

(54) METHOD AND DEVICE FOR CALIBRATING A WEIGHING SYSTEM OF A BLAST FURNACE TOP HOPPER

(75) Inventors: Guy Thillen, Diekirch (LU); Jeannot Loutsch, Mondercange (LU)

(73) Assignee: Paul Wurth S.A., Luxembourg (LU)

( * ) Notice: Subject to any disclaimer, the term of this patent is extended or adjusted under 35 U.S.C. 154(b) by 357 days.

(21) Appl. No.: 11/577,423

(22) PCT Filed: Oct. 18, 2005

(86) PCT No.: PCT/EP2005/055346

§ 371 (c)(1), (2), (4) Date: Apr. 18, 2007

(87) PCT Pub. No.: WO2006/042851

PCT Pub. Date: Apr. 27, 2006

(65) Prior Publication Data

US 2009/0044594 A1 Feb. 19, 2009

(30) Foreign Application Priority Data

Oct. 18, 2004 (LU) ....................................... 91 113

(51) Int. Cl.
*G01G 23/01* (2006.01)

(52) U.S. Cl. ........................................ 73/1.13; 702/101

(58) Field of Classification Search .................. 73/1.13; 702/101

See application file for complete search history.

(56) References Cited

U.S. PATENT DOCUMENTS 4,071,166 A * 1/1978 Legille et al. .................. 222/1

FOREIGN PATENT DOCUMENTS

| | | |
|---|---|---|
| GB | 2 237 651 | 5/1991 |
| JP | 62 156527 | 7/1987 |
| JP | 07 174612 | 7/1995 |
| SU | 1 278 598 | 12/1986 |
| WO | WO 2004/088259 | 10/2004 |
| WO | WO 2004088259 A1 * | 10/2004 |

OTHER PUBLICATIONS

International Search Report; PCT/EP2005/055346; May 17, 2006.

* cited by examiner

*Primary Examiner*—Hezron Williams
*Assistant Examiner*—Nathaniel Kolb
(74) *Attorney, Agent, or Firm*—Cantor Colburn LLP

(57) ABSTRACT

A method for calibrating a weighing system of a blast furnace top hopper and a corresponding weighing system are disclosed. The method comprises the step of using at least one actuator for exerting a vertical net force with a certain magnitude onto the hopper, so as to simulate a certain weight of charge material in the hopper; and the step of determining the magnitude of the vertical net force. According to the invention, the method further comprises the step of determining the magnitude of a pressure exerting a lifting force onto said hopper and the step of using the determined magnitude of the vertical net force and the determined magnitude of the pressure to establish calibration data for the weighing system.

21 Claims, 5 Drawing Sheets

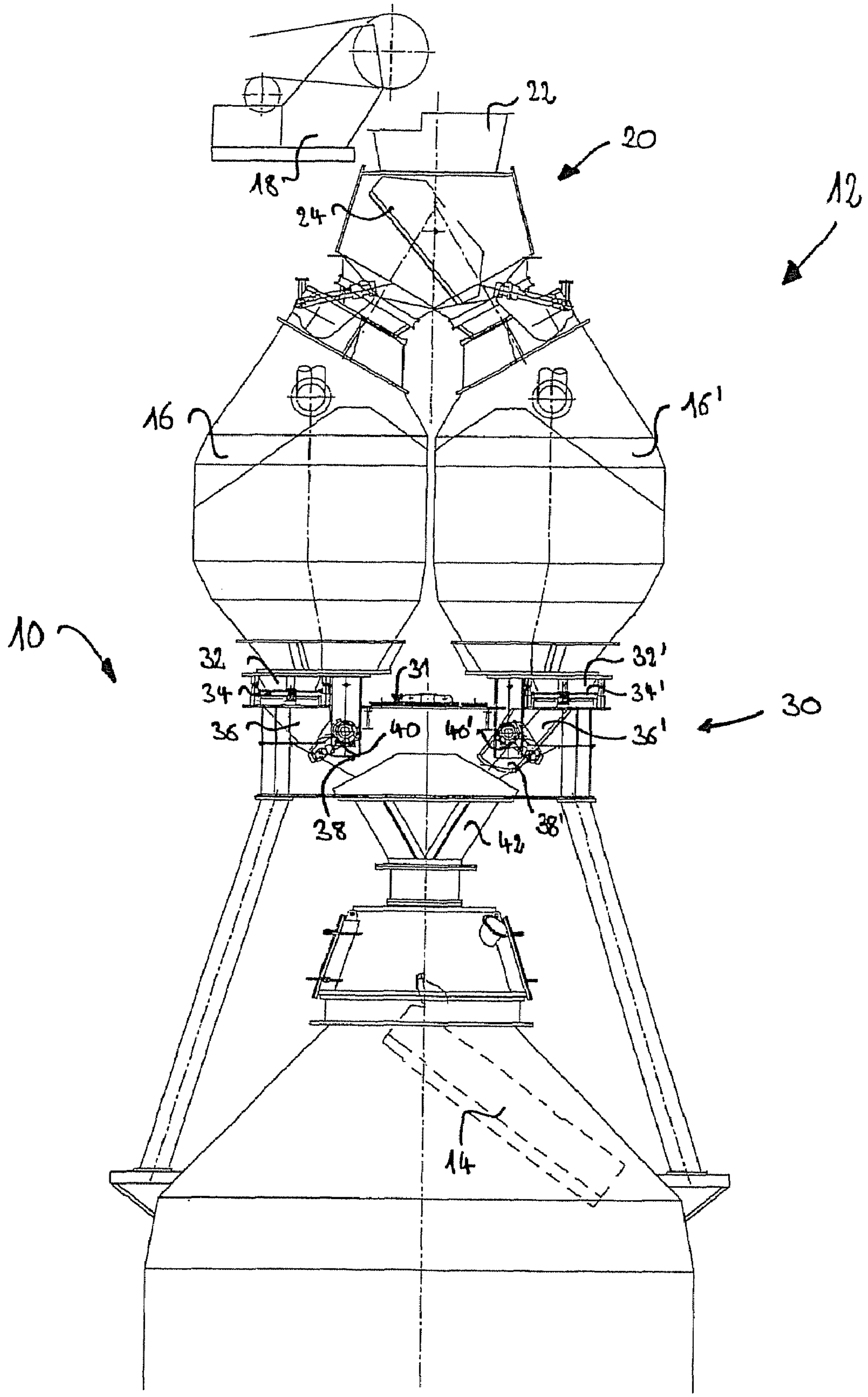
– Fig. 1 –

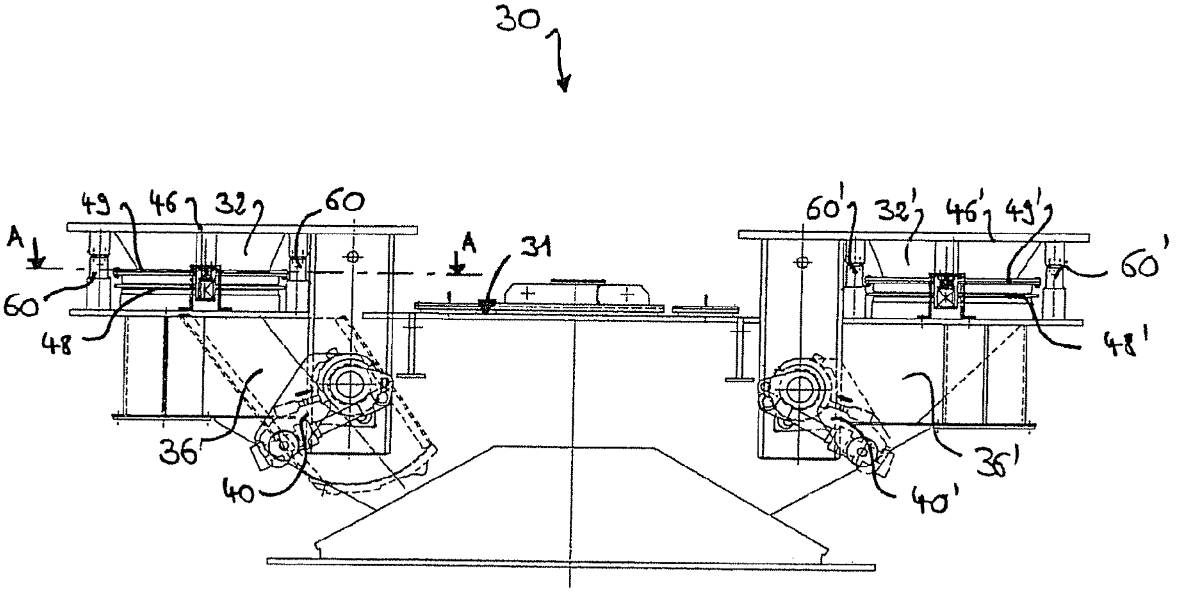
-Fig. 2 -

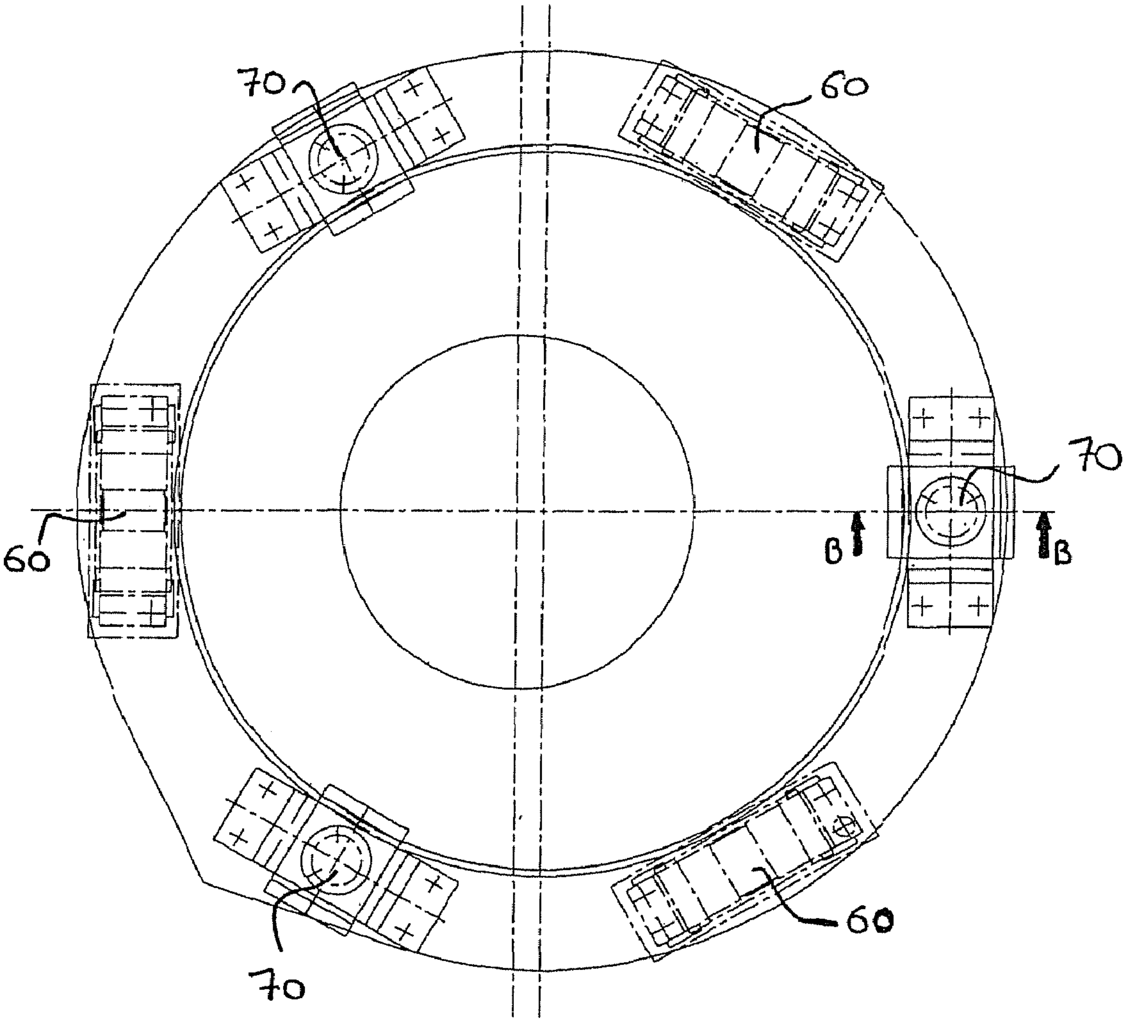
- Fig. 3 -

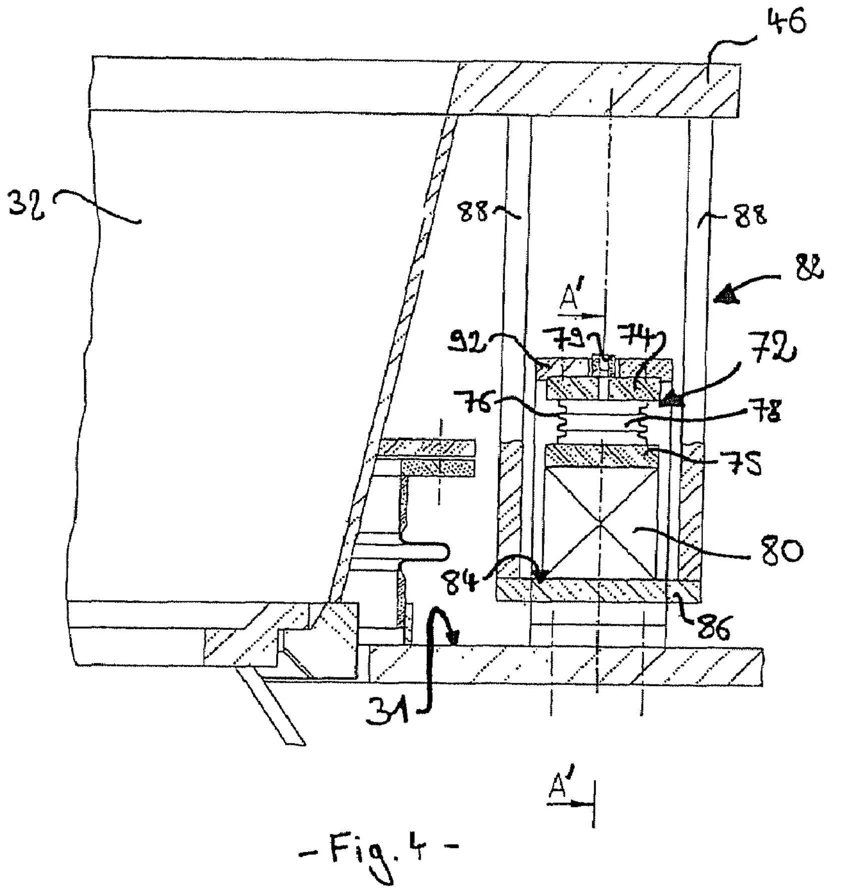
- Fig. 4 -
A'-A'
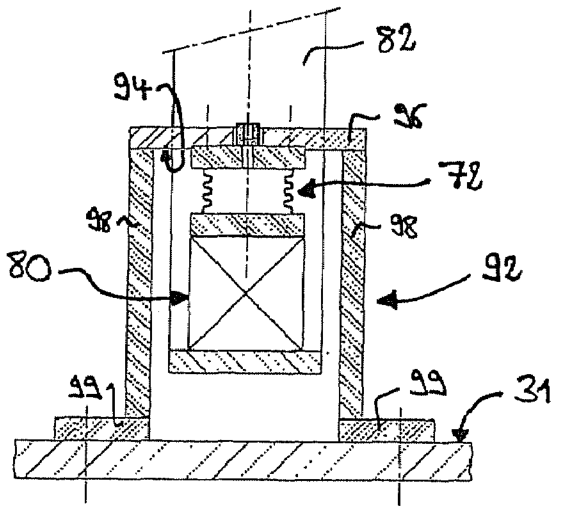
- Fig. 5 -

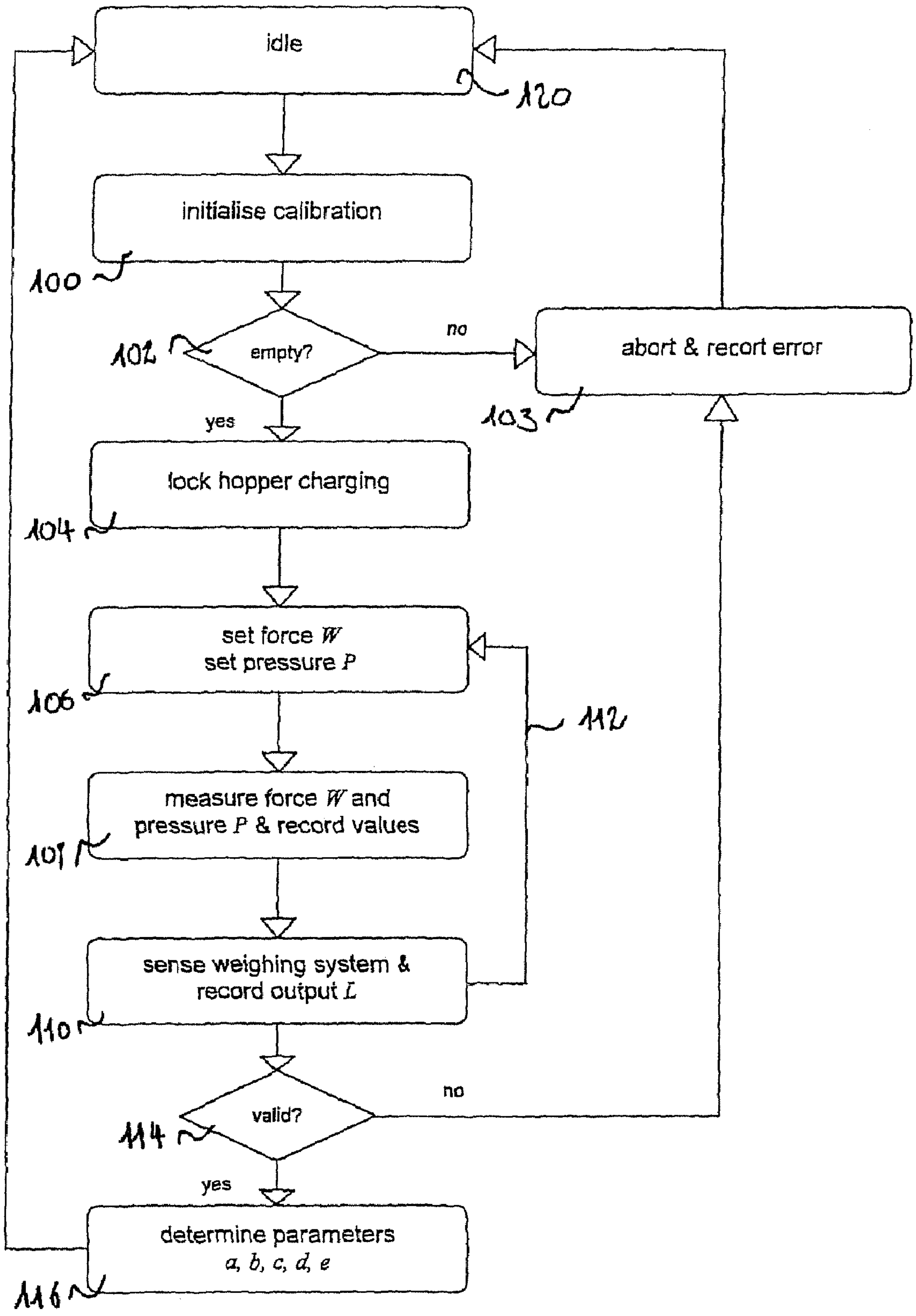
- Fig. 6 -

METHOD AND DEVICE FOR CALIBRATING A WEIGHING SYSTEM OF A BLAST FURNACE TOP HOPPER

TECHNICAL FIELD OF INVENTION

The present invention relates to weight measurement of charge material in a hopper. More specifically, the present invention is directed to a calibration method and device, which allow accurate weight measurement of charge material in a hopper, especially in a blast furnace top hopper.

BRIEF DISCUSSION OF RELATED ART

In various industrial applications, hoppers are used for temporary storage, for processing or for feeding of process material. In applications, where the weight of charge material is an important information for process control, a weighing system is commonly associated with such hoppers.

A specific case of such an application is the charging process of blast furnaces. It is known that the profile of the blast furnace charge over its cross section has a determining influence on the iron producing process. For optimal blast furnace operation, weight based charge distribution control is a matter of considerable importance. A popular solution for weight based charge distribution is for example the BELL-LESS TOP™ charging system developed by Paul Wurth S. A, with charge metering as described in U.S. Pat. No. 4,074,816. Weight measurement is thus an important aspect in charge distribution control.

In view of the above, accurate weight measurement of the top hoppers, and more particularly of the blast furnace raw materials temporarily stored therein, contributes to optimal hopper discharge control during the charging process. In this case, one of the difficulties is the lifting force exerted onto the top hoppers due to the internal blast furnace pressure. This lifting force hast to be compensated in function of the pressure. A known approach to add a weighing system to such top hoppers consists in providing multiple piezoelectric weight measurement cells, on which the top hoppers are supported in free standing manner. However, these weight measurement cells can take only positive efforts, i.e. compression forces. They cannot take negative or lateral forces. Therefore hold down springs and tie rods are always installed for compensation of lateral and negative, i.e. lifting, forces. This is detrimental for the accuracy of the weight measurement. Recent development efforts have provided new measurement equipment overcoming the above mechanical restriction. For example, German SCHENK Process GmbH, Darmstadt, has provided a so-called “Weighbeam DWB” for such applications, which can bear positive and negative forces as well as lateral forces.

However, the weighing results of these and other known systems may be initially inaccurate or become inaccurate over time for various reasons, such as mechanical prestress, e.g. due to size variations in installation parts or thermal displacements, pressure variations, sensitivity to ageing of measurement devices, incorrect hopper tare value, etc. There is therefore a need to check the validity, i.e. the correctness, of the measurements and to take corrective action if necessary. One known option is to disassemble the weighing system of a hopper and to remove the measurements instruments for replacement or calibration by an external institution. It will be understood that this procedure is cumbersome. Furthermore, due to the considerable loss in operation time and the related costs, this option is rarely used in practice. Another option is to attach heavy sample weights of known mass to the hopper in order to check the correctness of weight measurements. However, this option is also inexpedient and time consuming and, moreover, carries considerable safety risks related to the handling of such heavy weights.

WO2004/088259 discloses a device and a method for calibrating weighing devices such as weighing hoppers. According to WO2004/088259, the weighing device is loaded for the calibration method by means of a mobile device for calibration. A similar device and method are disclosed in GB 2 237 651, according to which a calibration load is applied through a weighing load cell and a calibration load cell to a vessel. Although both the devices and methods according to WO2004/088259 or GB 2 237 651 eliminate the need for sample weights, they are however not sufficiently suited for accurately calibrating the weighing system of a blast furnace top hopper.

BRIEF SUMMARY OF THE INVENTION

The invention provides an improved method and device for calibrating a weighing system of a blast furnace top hopper.

More particularly, the present invention proposes a method for calibrating a weighing system of a blast furnace top hopper comprising the step of using at least one actuator for exerting a vertical net force with a certain magnitude onto the hopper, so as to simulate a certain weight of charge material in the hopper, and the step of determining the magnitude of the vertical net force. According to an important aspect of the invention, the method further comprises the step of determining the magnitude of a pressure exerting a lifting force onto said hopper as well as the step of using both, the determined magnitude of the vertical net force and the determined magnitude of the pressure, to establish calibration data for the weighing system.

Thus the method uses at least one actuator, which functions as a mechanical means operatively associated to the hopper, in order to simulate a given hypothetical amount of charge material in the hopper. The need for real sample weights is thereby eliminated, and a simple and reliable solution is provided for exerting a vertical net force corresponding to the weight of a hypothetical charge in the hopper. The magnitude of the vertical net force can be determined, with little calculation effort, by knowledge of the effective force exerted by the actuator(s) or, alternatively, by use of additional measurement means for sensing the applied forces directly. Subsequently, the determined magnitude allows one to use the resulting value as reference signal of known quantity for establishing calibration data and subsequent calibration of the weighing system. The detrimental effect of the pressure exerting a lifting force onto the hopper is also taken into account when establishing calibration data. Identifying the effect of this pressure on the weighing system allows to eliminate or at least minimize errors in weight measurement which relate to this pressure and especially its variations and thereby increase weight measurement precision after calibration. This method provides fast and reliable calibration, which can be readily applied to existing weighing systems of blast furnace top hoppers. As another advantage, the method also provides a simple control of the operativeness of the weighing system.

As will be appreciated, with improved calibration of the weighing system of a blast furnace top hopper, a significant increase in reliability and accuracy of weight based charge distribution control can be achieved.

Generally, two modes of calibration can be effected with the method according to the invention. In a fast, simple and economical approach, the actuator or actuators are used only once per calibration process, in order to produce one single net force. Similarly, only one measurement of the pressure which exerts a lifting force onto the hopper is carried out during this mode of calibration. After determination of the magnitude of the net force, the latter is used as known quantity, together with the determined pressure, in order to calibrate the weighing system, e.g. the readings of the weighing beams, individually or collectively.

In another approach, which is preferable under certain circumstances, e.g. in case of a non-linear characteristic of the measurement system, the method further comprises the step of establishing calibration data for the weighing system by exerting vertical net forces of different magnitudes and determining the magnitude of each vertical net force. In other words, the actuators are operated several times per calibration process, each time for producing a different net force, i.e. different magnitude. The resulting data can then be used e.g. for determining the parameters of a (non-linear) weighing function or to obtain a calibration curve.

In order to further improve the calibration, it is preferable to also apply pressures of different magnitudes exerting different lifting forces onto the hopper. The magnitude of each pressure is determined and used to establish calibration data for the weighing system. Using pressures of different magnitudes allows to obtain a more accurate representation of the effect of the internal hopper pressure on the weighing system.

By varying exerted forces and by additionally varying the lifting pressure exerted onto the hopper, e.g. by changing internal furnace pressure or using a secondary pressure compensation system, extra data points can be acquired.

The calibration data are advantageously used to determine a formula of the type $W=f(L,P)$. In this formula, the actual weight W, is expressed as a function of the load measured by weight measuring means in the weighing system, represented by L, and the pressure exerting a lifting force onto said hopper, represented by P. More particularly, in a preferred embodiment, the calibration data serve to determine the parameters of a (non-linear) function or formula for weight calculation of the type: $W=a+bL+cL^2+dP+ePL$. These parameters a, b, c, d, e are determined numerically based on the plurality of values obtained previously by varying the vertical net force and/or the pressure and can then be used in subsequent weight measurements. During weight measurement, W represents the actual weight of charge material. As will be appreciated the accuracy of the value W is increased by best possible determination of the system parameters a, b, c, d, e, which is the objective of this variant of the calibration method. It may be noted that a formula of higher order may provide even better accuracy at the cost of more elaborate measurements and numerical determination.

A weighing system of a blast furnace top hopper, for carrying out the method for calibrating according to the invention, comprises at least one actuator for exerting a vertical net force with a certain magnitude onto the hopper, so as to simulate a certain weight of charge material in the hopper, and a force measuring means for determining the magnitude of the vertical net force. According to an important aspect of the invention, the weighing system further comprises pressure measuring means for determining the magnitude of a pressure exerting a lifting force onto said hopper and calibration means using both the determined magnitude of the vertical net force and the determined magnitude of the pressure to establish calibration data for said weighing system.

Preferably, the weighing system further comprises means for setting the pressure exerting a lifting force onto the hopper to a desired value. Conveniently, these means consist of the secondary pressure compensation system which is already installed with the usual air lock function of the top hopper. Alternatively, provided that the hopper communicates with the furnace throat, the installation for throat pressure control may be used to this purpose.

In a preferred embodiment, the force measuring means comprise at least one weight measuring cell serving as point of support to the actuator. One weight measuring cell is preferably associated to each actuator, for sensing the effective force exerted by the actuator. This weight measuring cell is arranged in load transmission so as to transfer the exerted force from the actuator to the hopper. This arrangement allows for reliable and accurate determination of the exerted vertical net force.

Advantageously, the weight measuring cell and the actuator are mounted in series and are arranged so as to have no support function with regard to the hopper. With such an arrangement, the measuring cell and the actuator can be easily disassembled and removed, which allows amongst others for reduced maintenance time, e.g. when replacing wearing parts of the hopper.

As a result, the method can advantageously further comprise the step of removing the weight measuring cell and calibrating it outside of the weighing system. By removing the weight measuring cell and having it calibrated by a suitable external institution, accuracy and reliability of the calibration of the weighing system is additionally increased.

In a preferred embodiment, the at least one actuator is a linear hydraulic actuator. Hydraulic actuators are particularly suitable for exerting forces of high magnitude, when reproducing the order of magnitude of usual hopper charges.

Advantageously, this linear hydraulic actuator comprises a first end plate and a second end plate, which is axially spaced from the first end plate, a compensator axially connected between the first end plate and the second end plate, whereby the compensator defines a hydraulic pressure chamber and means for supplying a hydraulic pressure fluid to the hydraulic pressure chamber. This provides a simple and reliable actuator construction. In case the vertical net force is determined by knowledge of the effective force exerted by the actuator, there should be sufficient certainty regarding the magnitude of the exerted force. This actuator construction has an advantage over conventional hydraulic jacks in that its efficiency ratio is very high and thereby it eliminates the uncertainty factor related to the efficiency ratio of conventional hydraulic jacks. Therefore, the exerted force can be determined by using knowledge of the applied hydraulic pressure and of the actuator geometry. Alternatively, when the net force is determined by other means, the latter can readily be cross-checked by this procedure.

In a preferred embodiment, three actuators are disposed in rotational symmetry with respect to the vertical central axis of the hopper and have effective directions parallel to the central axis. This arrangement insures a defined distribution of exerted forces. Moreover, this arrangement insures that the resulting net force, i.e. the vector sum of those forces exerted by the individual actuators, has its point of application on, and is substantially coaxial to, the vertical central axis of the hopper, thereby approximating the weight force of a sample charge.

The weighing system preferably comprises three weighing beams, the weighing beams being equi-circumferentially arranged on a base of the hopper so as to constitute a rigid tripod support for the hopper and being interleaved with three equi-circumferential actuators. Such weighing beams do not require compensation of lifting forces by use of e.g. pretension springs and they do not require compensation of lateral action by use of guiding means. However, the calibration method and device can also be used in combination with the aforementioned conventional weighing cells or other weighing systems. During calibration, this arrangement of the actuators and the weighing beams allows for uniform distribution of the exerted forces onto the weighing beams of the weighing system, while leaving sufficient space between the elements, e.g. for maintenance and operational interventions.

In another preferred embodiment of the weighing system, the actuator, the means for setting the pressure exerting a lifting force onto the hopper, the force measuring means and the pressure measuring means are connected to an automated process control system, for example a blast furnace process control system. With this embodiment, the calibration means is advantageously formed by the automated process control system, e.g. as an additional process of the blast furnace process control system. The calibration method and device described above can be readily added to new designs or integrated into existing weighing systems.

Other preferred embodiments of the weighing system correspond to those mentioned above, in relation to the method for calibrating according to the invention.

BRIEF DESCRIPTION OF THE DRAWINGS

The present invention will be more apparent from the following description of a not limiting embodiment with reference to the attached drawings, wherein FIG. 1: is a side view of a BELL-LESS TOP charging system on a blast furnace;

FIG. 2: is an enlarged side view of a weighing system and a discharge assembly as used in the blast furnace of FIG. 1;

FIG. 3: is a horizontal cross sectional view of the weighing system according to FIG. 2 (A-A);

FIG. 4: is a vertical cross sectional view of an actuator assembly used in the weighing system of FIG. 3 (B-B);

FIG. 5: is a vertical cross sectional view of the actuator assembly of FIG. 4 (A'-A');

FIG. 6: is a flow chart illustrating a preferred embodiment of a method for calibrating the weighing system of FIG. 3.

DETAILED DESCRIPTION OF THE INVENTION

In FIG. 1, reference 10 globally identifies a blast furnace. A BELL-LESS TOP™ charging system 12 of the parallel hopper type uses, in a manner known per se, an angularly adjustable rotary chute 14 for distribution of charge material into the hearth of the blast furnace 10. Two storage or top hoppers 16, 16' provide temporary storage of the charge material to be distributed by the chute 14. A conveyor belt mechanism 18 provides feeding of the top hoppers 16, 16' through a feeding assembly 20 arranged above and connected to hoppers 16, 16'. The feeding assembly 20 comprises a collecting cone 22 and a deviation chute 24 for selectively feeding and guiding charge material into either hopper 16 or 16'. Hoppers 16, 16' are constructed as pressure hoppers to insure that the blast furnace 10 remains sealed from the atmosphere during the charging process. Therefore, hoppers 16, 16' having an air lock function are each provided with upper and lower sealing valves (not shown).

A discharge assembly or valve block, globally identified by reference 30, is arranged approximately level with a charging platform 31 of the blast furnace 10 and communicates with the lower open ends of the hoppers 16, 16'. Discharge cones 32, 32' at the respective lower open ends of the hoppers 16, 16' are connected by flanges 34, 34' to discharge channels 36, 36'. Throttle or metering valves 38, 38' provide charge material flow control at the lower ends of the discharge channels 36, 36'. Accordingly, the valves 38, 38' enable controlled discharge of charge material from the hopper 16 or 16' to the rotary chute 14. The metering valves 38, 38' are set by hydraulic drives 40, 40'. Thus, charge material passes from the hoppers 16, 16' over the discharge channels 36, 36' to a central feeding spout 42 which directs the charge material vertically onto the rotary chute 14.

FIG. 2 shows in more detail the discharge assembly 30. On their upper ends, the discharge cones 32, 32' are welded to support rings 46, 46', which support the respective hoppers 16, 16'. On their lower ends, the discharge cones 32, 32' are flanged to corrugated compensators 48, 48' by connecting flanges 49, 49'. Compensators 48, 48' are supported on the charging platform 31 and provide sealing of the discharge assembly 30. The compensators 48, 48' being flexible, they have no supporting function for the hoppers 16, 16'.

As seen in FIG. 2, the support rings 46, 46' and the hoppers 16, 16' are supported by the charging platform 31 through weighing beams 60, 60'. Weighing beams 60, 60' are inserted intermediately between the support rings 46, 46' and the platform 31 and are rigidly connected thereto so as to function as support columns. This configuration insures, that the entire gross weight of the hoppers 16, 16', including charge material contained therein, is taken up by the respective weighing beams 60, 60'. The weighing beams 60, 60' constitute the sensors of a weighing system for weighing charge material contained in the hoppers 16, 16'. Suitable weighing beams are for example of the type "Weighbeam DWB" from SCHENK Process GmbH, Darmstadt.

As opposed to piezoelectric weighing cells used in the prior art, such weighing beams 60, 60' can absorb lateral forces as well as lifting forces. With this construction, in which weighing beams 60, 60' support the hoppers 16, 16', there is no need to provide mechanical compensation for lifting or lateral forces.

FIG. 3 is a vertical cross sectional view of plane A-A on FIG. 2 and shows the floor plan of the weighing beams 60 below the hopper 16. A similar floor plan applies to weighing beams 60' on the hopper 16'. Three weighing beams 60 are equi-circumferentially arranged about the vertical axis of the hopper 16 below the support ring 46. The weighing beams 60 thus constitute a rigid tripod support for the hopper 16 with its tripod legs equally distributed (at 120°). In order to allow an automated charge material weighing system, the weighing beams 60, 60' are, in a manner known per se, connected to a process control system of the blast furnace 10.

FIG. 3 also shows the arrangement of three actuator assemblies 70, provided in addition to the weighing beams 60. The actuator assemblies 70 are equi-circumferentially arranged about the vertical axis of the hopper 16 (at 120°), such that the weighing beams 60 are interleaved with the actuator assemblies 70 (at 60°).

FIG. 4 shows in more detail the actuator assembly 70 in vertical cross section. The actuator assembly 70 comprises a hydraulic actuator 72, a force measuring means 80 and a first and second U-shaped bow 82 and 92. Actuator 72 has a first upper circular end plate 74 and a second lower circular end plate 75. A corrugated compensator 76 sealingly connects the first end plate 74 to the second end plate 75. The compensator 76 allows axial elongation or contraction of the actuator 72 while maintaining parallelism of plates 74 and 75. The compensator 76 thus defines a hydraulic pressure chamber 78 which has a connection 79 to a hydraulic circuit at the upper end of actuator 72. This actuator construction allows for precise exertion of a force due to expansive action of compensator 76 when the hydraulic pressure chamber 78 is subject to a given hydraulic pressure. Such expansive action results in elongation of the cylinder defined by the first and second end plates 74, 75 and the compensator 76.

As shown in FIG. 4, the force sensing or measuring means 80, e.g. a conventional piezoelectric weight measuring sensor cell, is disposed in series with the actuator 72. The force measuring means 80 is preferably loosely inserted between the actuator 72 and the bow 82 for later removal and external calibration by a suitable institution. Force measurement means 80 is preferably connected to the process control system of the blast furnace 10, or alternatively, to a stand-alone calibration control system.

As can be seen in FIG. 4, the first rectangular solid U-shaped bow 82 is fixed on its upper open end to the support ring 46 of the hopper 16. Bow 82 defines a first working surface 84 on the upper face of its substantially horizontal bottom plate 86, which is in rigid connection to hopper 16 by means of side plates 88. A second rectangular solid U-shaped bow 92 is engaging the first bow 82, being longitudinally rotated by 90° and arranged upside down with respect to the bow 82. Dimensions of bow 92 are chosen so as to enable insertion into the bow 82 and allowing relative movement thereto without friction.

As shown in FIG. 5, the bow 92 provides a second working surface 94 on the lower face of its top plate 96. The bow 92 is rigidly but detachably mounted to the charging platform 31 through sole plates 99, which are for example fastened to the platform 31, by use of nuts and bolts.

Actuator 72, by forcing apart the working surfaces 84 and 94, will exert a vertical downwardly directed force on the hopper 16. During construction, attention is paid on respective parallelism of the end plates 74 and 75 of the actuator 72 and of the plates 86, 88 and the plates 96, 98 of the bows 82 and 92 respectively. As a result, forces exerted by the actuator 72 are vertically and downwardly directed. The construction described above therefore allows for use of conventional piezoelectric weighing cells as force measuring means 80, because of the absence of any lateral or lifting force exerted onto the measuring means 80.

Returning FIG. 3 and the arrangement of the actuator assemblies 70, it will be appreciated, that no independent control of the actuators 72 is necessary. Each actuator 72 can be connected to the same hydraulic circuit by its respective connection 79, so as to be subject to the same hydraulic pressure. Generally, the three actuators 72 are operated simultaneously. The actuators 72 being connected to a hydraulic circuit, their operation can be remotely controlled. An electromechanical valve, which is preferably operable by the aforementioned process control system, controls the activation of actuators 72. In case multiple forces of different magnitudes are to be exerted, a hydraulic pressure control valve can be used for applying different hydraulic pressures on the pressure chambers 78. The use of a three-way valve allows for connecting the actuators 72' of the hopper 16' to the same circuit. It is to be noted that a corresponding set of actuator assemblies 70', comprising actuators 72' and force measurement means 80', is provided for the hopper 16'. Moreover, installation of the described arrangement of the actuator assemblies 70, 70' does not require changes to the construction of the discharge assembly 30 of conventional type, as used e.g. with the BELL-LESS TOP™ system. They can therefore readily be added to existing blast furnaces. Also, maintenance interventions on the discharge assembly 30 are not impeded, as the actuator assemblies 70, 70' can be easily removed.

It will be appreciated that, due to the rotationally symmetric arrangement of the actuator assemblies 70, the forces exerted by the actuators 72 result in a vertical, downwardly directed net force having its point of application within the hopper 16, essentially on its central longitudinal axis. This resulting net force corresponds to a weight force exerted by gravity on a hypothetical, corresponding amount of charge material contained in the hopper 16. Moreover, the actuators 72 provide a simple mechanism for controlling function and correct measurements of the weighing beams 60.

Thus the actuator assemblies 70 can provide one or more suitable measurands of known quantity. The actuators 72, 72' and the force measurement means 80, 80' as described above allow for calibration of the hopper weighing system comprising the weighing beams 60, 60'.

When using the weighing system, the weighing result is commonly obtained by a calculation based on the readings of weighing beams 60, 60' (or similar prior-art devices). In practice, the following non-linear formula has proven effective to modelize the actual weight in the hopper:

$$W=a+bL+cL^2+dP+ePL \qquad (1)$$

wherein

W: is the actual weight in the hopper 16, 16';

L: is the load indicated by weighing beams 60, 60';

P: is the pressure exerted onto hopper 16, 16';

a, b, c, d, e: are system parameters.

In this case, the calibration method insures determination of the parameters a, b, c, d, e with best possible precision. Higher degree equations could be used to achieve higher accuracy but they require more parameters to be determined.

The exemplary flow-chart in FIG. 6 illustrates a preferred method for calibrating the weighing system of FIG. 3, i.e. determining parameters a, b, c, d, e in equation (1). It will be appreciated that the calibration method can be executed as a fully automated calibration process by use of e.g. a subroutine in the process control system of the blast furnace 10, or alternatively by an additional calibration control system. The calibration method for either the hopper 16 or 16' will normally be executed during a non-charging period of the respective hopper 16 or 16'. Preferably the calibration procedures for the hopper 16 and 16' are operated consecutively, which is compatible with the charging procedure alternating between parallel hoppers 16 and 16' and allows sharing the same resources. While in the following the method is described for hopper 16 only, the method also applies for hopper 16' with accordingly adapted reference numerals.

The method starts with initialization 100 of the calibration system, i.e. for example pressurizing the hydraulic circuit for the actuators 72 and taring the force measurement means 80. Preferably a check for emptiness 102 of the hopper 16 is executed, for example by sensing the weighing beams 60. When emptiness is asserted, charging of the respective hopper 16 is blocked 104. Otherwise the calibration process is aborted 103. Thereafter, the three actuators 72 are simultaneously operated 106 by the process control system in order to simulate a given charge weight in the hopper 16. At essentially the same time, the pressure causing a lifting force onto hopper 16 is actively controlled and set to a desired value. It may be noted, that an internal pressure control of blast furnace 10 or a secondary pressure compensation on hopper 16, which is commonly available for use in the aforementioned air lock function of hopper 16, can be exploited for setting this pressure. Actuators 72 being effective, the current magnitude W of the effective vertical net force corresponding to the given weight is determined by use of the measurement means 80 and the result is recorded 108. This step provides a measurand of known quantity and an according value W required for calibration. Simultaneously to determining the magnitude W of the exerted force, the current pressure P exerting a lifting force onto the hopper 16 is determined by measurement and recorded. Due to the air lock function of the hopper 16, the magnitude of its internal pressure P varies between atmospheric and furnace throat pressure (e.g. up to 2.5-3.5 bar). Moreover, when the hopper 16 communicates with the furnace throat during charging, the pressure P may vary because of varying internal pressure in the blast furnace 10. When above atmospheric, the internal pressure P in hopper 16 results in a force which extends the compensator 48 and thus slightly lifts the hopper 16. This lifting force consequently reduces the load measured by the weighing beams 60. Furthermore, it has been found that the internal hopper pressure P may also affect weight measurements because of a tilting momentum produced by the conduit(s) for secondary pressure compensation which are usually connected to the upper portion of hopper 16. Therefore, the pressure P detrimentally affects the correctness of the value W during normal weight measurements, as appears from equation (1). It may be noted that because of its varying magnitude, the effect of pressure P cannot simply be eliminated like a constant reaction force reducing the tare weight of hopper 16. In order to eliminate or at least reduce measurements errors due to this lifting force, the varying effect of the internal pressure P of the hopper 16 on the value W is therefore taken into account during calibration. Both during calibration and normal weight measurement, the pressure P is conveniently measured by one or more pressure transducers of known type which are connected to the calibration system (e.g. the process control system of the blast furnace 10). Such pressure transducers are usually already installed in or at the hopper 16 because of its air lock configuration, e.g. in a conduit for secondary pressure compensation on hopper 16.

Simultaneously or directly afterwards, the output L of the weighing beams 60 is read and recorded 110. Per calibration sequence, the latter two steps 108 and 110 are carried out multiple times in a loop 112, for different measurands W, pressures P and according outputs L. Herein the different simulated weights W are determined by the actuators 72, while the pressure P is set as mentioned above. Multiple different measurands W, pressures P and outputs L allow for numerical determination of parameters a, b, c, d, e. After the different measurands W, pressures P and outputs L have been recorded, they are preferably subjected to a validity check in step 114, e.g. based on empirical data or on a cross check with hydraulic pressure. This insures that the weighing beams 60 cannot be calibrated with a falsified quantity, e.g. due to any malfunction. In case the values W, P or L appear falsified, the calibration process is aborted 103. With correct values W, P and L asserted, the parameters a, b, c, d, e for subsequent use in the equation (1) are numerically determined in step 116. The step 116 is preferably carried out by computing means within the process control system of the blast furnace 10. The step 116 thus terminates one instance of the calibration process of the weighing system, thereafter the process returns to an idle mode 120, from which it can be initialized again. The parameters a, b, c, d, e are subsequently used for determination of weight W of actual hopper charges until the next calibration sequence.

The method described above can be executed in fully automated manner, as frequently as desired, e.g. in regular time intervals and several times a day. It can be executed during a campaign of the blast furnace 10 without the need for a service stop. It will be appreciated that the method is executable in a very short lapse of time, e.g. 60 seconds, especially when carried out by an automated process control system. Besides providing automatic calibration, the method also provides control of operativeness of the weighing system. Additionally, using the calibration method will insure repeatability of weight measurements, even on weighing systems subject to ageing. For increased precision of calibration, the force measurement means 80 can be additionally removed and calibrated themselves by a suitable external institution in regular intervals, e.g. once per year.

In conclusion, it will be appreciated that, by using the calibration device and method described above and thereby increasing accuracy and reliability of weight measurements a substantial improvement to charge material weight measurement and accordingly charge distribution control is provided.

The invention claimed is:

1. A method for calibrating a weighing system of a blast furnace top hopper comprising:

using at least one linear hydraulic actuator for exerting a vertical net force with a certain magnitude onto said hopper, so as to simulate a certain weight of charge material in said hopper;

wherein said at least one linear hydraulic actuator comprises:

a first end plate and a second end plate, said second end plate being axially spaced from said first end plate;

a corrugated compensator axially connected between said first end plate and said second end plate, said compensator defining a hydraulic pressure chamber; and means for supplying a pressure fluid to said hydraulic pressure chamber;

determining said magnitude of said vertical net force; and using said determined magnitude of said vertical net force to establish calibration data for said weighing system.

2. The method according to claim 1, further comprising:

determining the magnitude of a pressure exerting a lifting force onto said hopper; and using said determined magnitude of said vertical net force and said determined magnitude of said pressure to establish calibration data for said weighing system.

3. The method according to claim 1, further comprising:

exerting vertical net forces of different magnitudes onto said hopper;

determining the magnitude of each of said vertical net forces; and using said determined magnitudes of said vertical net forces to establish calibration data for said weighing system.

4. The method according to claim 2, further comprising:

applying pressures of different magnitudes exerting different lifting forces onto said hopper; and determining the magnitude of each of said pressures; and using said determined magnitudes of said pressures to establish calibration data for said weighing system.

5. The method according to claim 2, further comprising:

exerting vertical net forces of different magnitudes onto said hopper and determining the magnitude of each of said vertical net forces;

applying pressures of different magnitudes exerting different lifting forces onto said hopper and determining the magnitude of each of said pressures; and using said determined magnitudes of said vertical net forces and said pressures to establish calibration data for said weighing system.

6. The method according to claim 2, further comprising:

using said calibration data to determine a formula of the type W=f(L;P) for weight calculation, wherein:

W=actual weight;

L=load measured by weight measuring means; and

P=pressure exerted on said hopper.

7. The method according to claim 6, wherein said formula is non-linear.

8. The method according to claim 6, wherein said formula is a polynomial in two variables L and P.

9. The method according to claim 8, wherein said polynomial includes a term P·L.

10. The method according to claim 6, wherein said formula is of the type:

$$W=a+bL+cL^2+dP+eP\cdot L$$

wherein

W=actual weight;

L=load measured by weight measuring means;

P=pressure exerted on said hopper; and wherein a, b, c, d, e are system parameters determined by said method for calibrating a weighing system.

11. A method for weighing charge material in a blast furnace top hopper, using a formula of the type W=f(L;P) for weight calculation, wherein:

W=actual weight of said charge material;

L=load measured by weight measuring means; and

P=pressure exerted on said hopper; and said formula is determined with a calibrating method comprising following steps:

using at least one linear hydraulic actuator for exerting a vertical net force with a certain magnitude onto said hopper, so as to simulate a certain weight of charge material in said hopper; wherein said at least one linear hydraulic actuator comprises:

a first end plate and a second end plate, said second end plate being axially spaced from said first end plate and a corrugated compensator axially connected between said first end plate and said second end plate, said corrugated compensator defining a hydraulic pressure chamber;

determining said magnitude of said vertical net force;

determining the magnitude of a pressure exerting a lifting force onto said hopper; and using said determined magnitude of said vertical net force and said determined magnitude of said pressure as calibration data to establish said formula W=f(L; P).

12. A weighing system of a blast furnace top hopper comprising:

at least one linear hydraulic actuator for exerting a vertical net force with a certain magnitude onto said hopper, so as to simulate a certain weight of charge material in said hopper, said linear hydraulic actuator comprising a first end plate and a second end plate, said second end plate being axially spaced from said first end plate and a corrugated compensator axially connected between said first end plate and said second end plate, said corrugated compensator defining a hydraulic pressure chamber;

a force measuring device for determining the magnitude of said vertical net force; and a calibration device for using said determined magnitude of said vertical net force to establish calibration data for said weighing system.

13. The weighing system according to claim 12, further comprising a pressure measuring device for determining the magnitude of a pressure exerting a lifting force onto said hopper; means for setting said pressure exerting a lifting force onto said hopper to a desired value; and said calibration device being configured for using said determined magnitude of said vertical net force and said determined magnitude of said pressure to establish calibration data for said weighing system.

14. The weighing system according to claim 12, wherein said force measuring device comprises a weight measuring cell serving as point of support to said linear hydraulic actuator.

15. The weighing system according to claim 14, wherein said weight measuring cell and said linear hydraulic actuator are mounted in series and are arranged so as to have no support function with regard to said hopper.

16. The weighing system according to claim 12, wherein said hopper has a vertical central axis and three linear hydraulic actuators are disposed in rotational symmetry with respect to said axis and have effective directions parallel to said axis.

17. The weighing system according to claim 12, comprising three weighing beams equi-circumferentially arranged on a base of said hopper so as to constitute a rigid tripod support for said hopper and said weighing beams being interleaved with three equi-circumferentially arranged linear hydraulic actuators.

18. The weighing system according to claim 13, wherein said linear hydraulic actuator, said means for setting the pressure exerting a lifting force onto said hopper, said force measuring device and said pressure measuring device are connected to an automated process control system and wherein said calibration device is constituted by said automated process control system.

19. A method for weighing charge material in a blast furnace top hopper, using a formula of the type W=f(L;P) for weight calculation, wherein:

said formula W=f(L;P) is a polynomial in two variables L and P including a term P·L;

W=actual weight of said charge material;

L=load measured by weight measuring means; and

P=pressure exerted on said hopper; and said formula is determined with a calibrating method comprising following steps:

using at least one linear hydraulic actuator for exerting a vertical net force with a certain magnitude onto said hopper, so as to simulate a certain weight of charge material in said hopper, said linear hydraulic actuator comprising a first end plate and a second end plate, said second end plate being axially spaced from said first end plate and a corrugated compensator axially connected between said first end plate and said second end plate, said corrugated compensator defining a hydraulic pressure chamber;

determining said magnitude of said vertical net force;

determining the magnitude of a pressure exerting a lifting force onto said hopper; and using said determined magnitude of said vertical net force and said determined magnitude of said pressure as calibration data to determine coefficients of said polynomial formula W=f(L;P).

20. A method for weighing charge material in a blast furnace top hopper, using a formula of the type W=f(L;P) for weight calculation, wherein:

said formula W=f(L;P) is of the type: $W=a+bL+cL^2+dP+eP\cdot L$

W=actual weight of said charge material;

L=load measured by weight measuring means;

P=pressure exerted on said hopper; and coefficients a, b, c, d, e are system parameters said formula is determined with a calibrating method comprising following steps:

using at least one linear hydraulic actuator for exerting a vertical net force with a certain magnitude onto said hopper, so as to simulate a certain weight of charge material in said hopper, said linear hydraulic actuator comprising a first end plate and a second end plate, said second end plate being axially spaced from said first end plate and a corrugated compensator axially connected between said first end plate and said second end plate, said corrugated compensator defining a hydraulic pressure chamber;

determining said magnitude of said vertical net force;

determining the magnitude of a pressure exerting a lifting force onto said hopper; and using said determined magnitude of said vertical net force and said determined magnitude of said pressure as calibration data to determine said system parameters a, b, c, d, e, of said formula W=f(L;P).

21. A weighing system of a blast furnace top hopper comprising:

three weighing beams equi-circumferentially arranged on a base of said hopper so as to constitute a rigid tripod support for said hopper;

at least one linear hydraulic actuator for exerting at least one vertical net force with a certain magnitude onto said hopper, so as to simulate a certain weight of charge material in said hopper, said linear hydraulic actuator comprising a first end plate and a second end plate, said second end plate being axially spaced from said first end plate and a corrugated compensator axially connected between said first end plate and said second end plate so as to define a hydraulic pressure chamber;

a force measuring device for determining the magnitude of said at least one vertical net force; and a process control system configured to establish calibration data for said weighing system using said determined magnitude of said at least one vertical net force.

* * * * *